C. H. REYNOLDS.
WHEEL.
APPLICATION FILED APR. 23, 1913.

1,118,807.

Patented Nov. 24, 1914.

WITNESSES

INVENTOR
Curtis H. Reynolds
BY Munn & Co.
ATTORNEYS

__UNITED STATES PATENT OFFICE.__

CURTIS H. REYNOLDS, OF MAXWELL, CALIFORNIA.

WHEEL.

1,118,807.
Specification of Letters Patent.
Patented Nov. 24, 1914.

Application filed April 23, 1913. Serial No. 763,057.

*To all whom it may concern:*

Be it known that I, CURTIS H. REYNOLDS, a citizen of the United States, and a resident of Maxwell, in the county of Colusa and State of California, have made certain new and useful Improvements in Wheels, of which the following is a specification.

My invention is an improvement in wheels, and has for its object the provision of a wheel adapted for use in automobiles, and the like, wherein the hub is resiliently connected with an inner wheel, which in turn is supported by the rim, the hub being so arranged that it may yield in every direction with respect to the rim.

Figure 1:
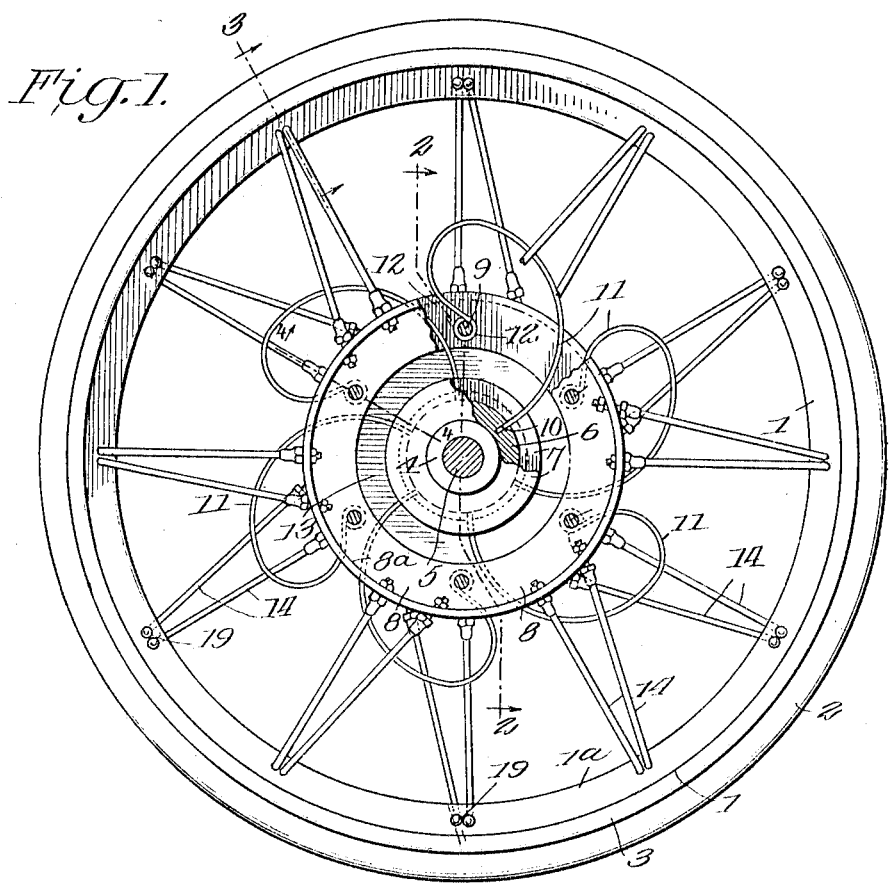
Figure 3:
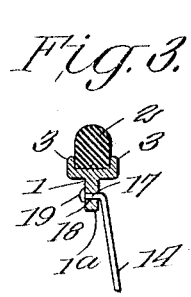
Figure 2:
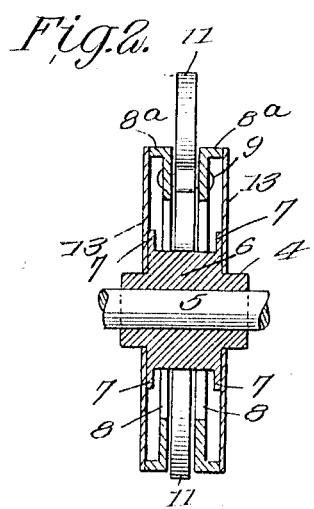
Figure 4:
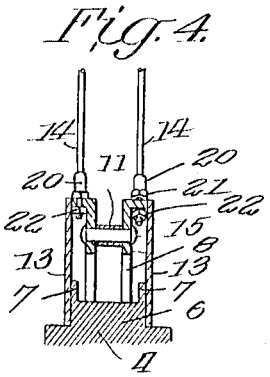

In the drawing, Figure 1 is a side view partly in section, of the improved wheel, and Figs. 2, 3 and 4 are sections on the lines 2—2, 3—3, and 4—4, respectively, of Fig. 1.

In the present embodiment of the invention, the rim 1 is provided with a radially extending web $1^a$, and at each side the rim is outwardly flanged as shown at 3, and a tire 2 of rubber or the like is seated on the rim between the flanges.

The hub 4 has a central bore for receiving the spindle 5 of the axle, and the said hub is provided intermediate its ends with an annular rib 6, and the said rib is annularly flanged at each side, as indicated at 7. The inner wheel is composed of annular frames or rings 8, and the said rings are arranged in parallelism, and on the inner sides of the flanges 7 and co-axial with the hub. The said rings are connected at spaced intervals by rivets 9, the said rivets extending through registering openings in the rings and being headed at each end as shown. The rib 6 of the hub is provided at spaced intervals with radial slots 10, and in each of the said slots one end of a plate spring 11 is seated. Each of the said springs 11 has its outer end connected with one of the rivets 9, before mentioned, the outer end of the spring being bent to form a bearing ring 12, which encircles the rivet between the rings 8.

It will be noticed that each of the springs 11 is curved, and the springs are similarly arranged. The springs extend outward toward the rim for some little distance, then extend approximately parallel with the rim, and are then bent inwardly toward the hub to their engagement with the rivets 9, in such manner that the greater portion of the spring is outside the rings 8. The hub and its connection are thus supported by the frame composed of the rings 8 and the rivets 9, and are so mounted that they may yield in every direction with respect to the said frame, the movement being limited, however, by the frame.

Annular cheek plates 13 are arranged on each side of the rib 6 of the hub, each cheek plate having a central opening for receiving the end of the hub, and the said cheek plates fit closely against the ends of the rib 6, and against the outer faces of the flanges 7. The periphery of each of the cheek plates 13, is flush with the periphery of the adjacent ring 8, and each of the rings 8 is provided with a marginal, lateral flange $8^a$, extending outwardly into contact with the inner faces of the adjacent cheek plate.

The springs 11, before mentioned, are between the rings 8, and the flanges $8^a$ close the space between the said rings 8 and the cheek plates 13. The flanges $8^a$ of the rings 8 are connected with the radial web $1^a$ of the rim, by means of spokes 14, the said spokes being arranged in two series, and in pairs in each series. As shown in Fig. 1, the outer end of each spoke is bent laterally as shown at 17, and passes through an opening 18, in the web $1^a$ of the rim. Each spoke is headed as shown at 19, on the opposite side of the web, to prevent disengagement thereof, and the inner end of each spoke is passed through an opening in the flange $8^a$ of the adjacent ring 8, and connected to the said flange in the manner shown in Fig. 4. Each spoke has its inner end threaded, and a nut 20 is threaded on to each of the said spokes, the lower end of the nut being enlarged annularly and polygonal in cross section, as shown in Fig. 1, for engagement by a wrench or the like to turn the said nut. The inner extremity of each spoke is passed through an opening in the flange $8^a$, and the said extremity is engaged by a lock nut 22 on the inner side of the flange to prevent disengagement of the spoke.

By means of the nuts 20, and 22, the spokes may be adjusted to properly space the inner wheel from the rim. When a spoke becomes bent or broken and it is desirable to replace the same, the injured spoke may be released by removing the nut 22. Access may be had to the nuts by removing the cheek plates 13, and the said plates may be held in place in any suitable manner.

From an inspection of Fig. 1, it will be seen that the members of each pair of spokes are arranged at an angle to each other. The members of each pair have their outer ends connected to the web 1ª adjacent to each other, and one member of each pair is substantially radial to the wheel, the other being inclined, and diverging from its fellow toward the hub. It will also be noticed that the adjacent pairs of the two series are oppositely arranged, the radial members of the pairs being at the outer sides of the inclined members of the pairs and the said inclined members cross each other adjacent to the flanges 8ª.

Any usual or desired form of tire may be used in connection with the improved wheel, either the solid tire as shown, or a tire having other cross sectional form. The wheel has sufficient resiliency to permit the use of a solid tire, thus dispensing with the expensive and fragile pneumatic tire. The arrangement of the spokes also improved the general aspect of the wheel. The one member of each pair of spokes is approximately tangential to the wheel, while the other member of each pair is approximately radial. A truss construction is thus provided, the tangential spoke of each pair strengthening, assisting and reinforcing the radial member of the pair. The hub 4 may be considered as having an annular groove on its periphery, the flanges 7 forming the walls of the groove.

I claim:—

A wheel of the character specified, comprising a rim having an external groove for receiving a tire and having a radial web, a hub having an annular rib intermediate its ends, said rib being annularly grooved, an annular frame arranged co-axial with the hub, said frame consisting of rings spaced apart from each other, rivets connecting the rings at spaced intervals, a plurality of arched springs arranged between the hub and the frame, each spring having one of its ends connected with a rivet, the hub having a radial recess in the bottom of the groove for receiving the other end of the spring, the intermediate portion of the spring extending outside of the annular frame, a cheek plate at each side of the annular frame, said plates fitting the hub against the ends of the rib and extending from their peripheries to the peripheries of the rings, each ring having a marginal lateral flange abutting the inner face of the adjacent cheek plate, and a plurality of series of spokes connecting the frame with the web of the rim.

CURTIS H. REYNOLDS.

Witnesses:
ALSTON AYER,
GUY STORMER.

Copies of this patent may be obtained for five cents each, by addressing the "Commissioner of Patents, Washington, D. C."